United States Patent [19]
Wrobel

[11] Patent Number: 5,274,289
[45] Date of Patent: Dec. 28, 1993

[54] BUTTING RING FOR A ROTOR SHAFT

[75] Inventor: Gunter Wrobel, Villingen, Fed. Rep. of Germany

[73] Assignee: Papst Motoren GmbH & Company KG, Fed. Rep. of Germany

[21] Appl. No.: 826,819

[22] Filed: Jan. 28, 1992

[30] Foreign Application Priority Data

Jan. 28, 1991 [DE] Fed. Rep. of Germany ... 9100942[U]

[51] Int. Cl.⁵ .......................... H02K 5/16; F16C 25/00
[52] U.S. Cl. ......................................... 310/90; 384/261
[58] Field of Search ....................... 310/90, 51, 42, 91; 384/489, 208, 209, 215, 261

[56] References Cited

U.S. PATENT DOCUMENTS

| | | | |
|---|---|---|---|
| 3,935,489 | 1/1976 | Church et al. | 310/90 |
| 4,523,118 | 6/1985 | Cunningham | 310/90 |
| 4,800,309 | 1/1989 | Lakin | 310/90 |
| 5,109,171 | 4/1992 | Schmider | 310/51 |

Primary Examiner—Steven L. Stephan
Assistant Examiner—Matthew Nguyen
Attorney, Agent, or Firm—Barnes & Thornburg

[57] ABSTRACT

An electric motor has a rotor shaft which is journalled in an axial bearing located within a bearing tube of a stator. To control relative axial movement of the rotor shaft and bearing, a butting ring is fixed, by supporting arms, in the butt end of the rotor shaft. An abutment surface of the butting ring abuts an end face of the bearing. Lubricant pockets are formed in the abutment surface to hold a lubricant. A further supply of lubricant is received within a lubricant storage pocket formed in a surface of said butting ring opposed to said abutment surface. The lubricant storage pocket is connected to the lubricant pockets by way of connecting channels.

12 Claims, 6 Drawing Sheets

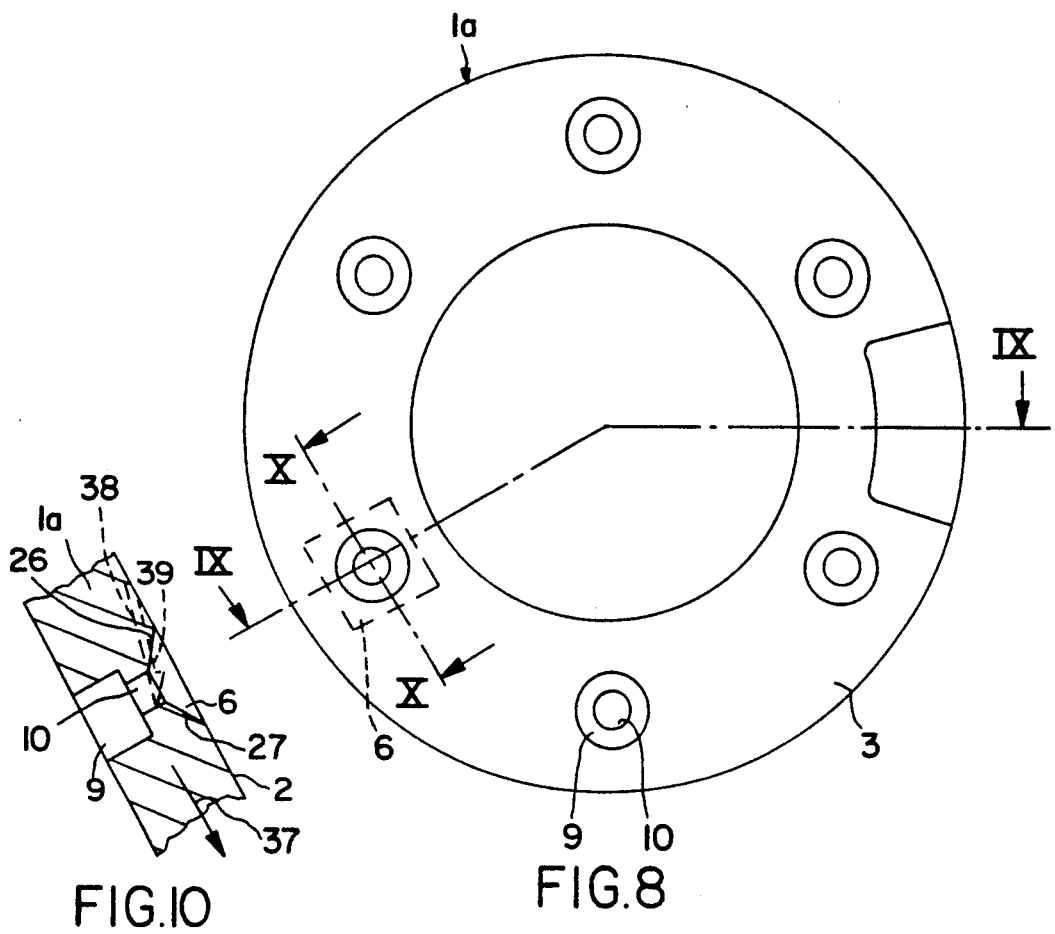
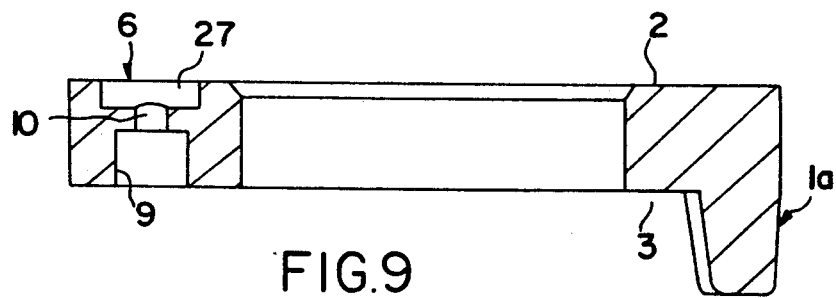

5,274,289

BUTTING RING FOR A ROTOR SHAFT

BACKGROUND TO THE INVENTION

The present invention relates to a butting ring for a rotor shaft, particularly of an electric motor.

A rotor shaft journalled in bearings will generally have some axial clearance, and thereby be movable axially in the bearings. It has thus become usual to provide the rotor shaft with at least one butting ring to limit the axial movement of the rotor shaft, at least in one direction, by causing the rotor shaft, or a part associated therewith, to abut a stationary stop face of the butting ring. Such arrangements are frequently used, for example, where the rotor shaft is provided in a motor, for example, an electric motor.

However, in the same way as the motor bearings, the butting surface of the butting ring must be lubricated.

During manufacture, a lubricant is introduced at the corresponding location of the butting ring and this supply is generally sufficient for a certain motor running time, and frequently, even, for the entire motor life. The butting surface abuts against, for example, the front end of a bearing, (in general a journal bearing or against a sliding disc, which is generally made from steel), which is positioned axially upstream of said front end of the bearing.

It is an object of the present invention to ensure that there is a lubricant supply for the butting ring of a rotor shaft for a maximum period of time, and that there is little risk of the lubricant supply proving inadequate, being lost or reaching unfavourable points of the motor.

SUMMARY OF THE INVENTION

According to the present invention there is provided a butting ring for a rotor shaft, said butting ring having an abutment surface arranged to abut against a stop face, wherein at least one lubricant pocket is provided in the abutment surface of the butting-ring.

In an embodiment, wherein the butting ring is arranged to rotate, the or each said lubricant pocket is shaped such that it tapers away from the rotation direction of the abutment surface. That is, the lubricant pocket becomes axially thinner against the rotation direction to the abutment surface.

For practical reasons, the shape of the or each lubricant pocket may be a spherical segment or part of a cone, which can be produced with simple tools. An even better lubricant distribution may be obtained by providing the lubricant pockets with sloping surfaces, which taper in a very constant manner. That is, to form an axially uniform thinning of the lubricant pocket, particularly close to the abutment surface, with the entire radial width towards the latter, particularly if the entire axial width thereof tapers. These surfaces can be made planar or in such a way as to approach the abutment surface as tangentially as possible.

In a preferred embodiment, several lubricant pockets are distributed over the butting ring, spaced from one another by substantially equal angular distances.

In order to ensure a particularly uniform and long-term, abundant supply of lubricants, a particularly advantageous embodiment of the invention provides at least one lubricant storage pocket in said butting ring.

Preferably the or each said lubricant storage pocket is provided in a rear surface of said butting ring. The or each said lubricant storage pocket may be connected to the or each lubricant pocket by means of a connecting channel or duct, for example, extending axially through the butting ring. This arrangement also offers the advantage that the introduction of lubricant can take place from the free rotor shaft butt end, so that the lubricant filling process is possible at the end of the assembly of the motor.

If several lubricant pockets are provided, there is preferably an identical number of lubricant storage pockets at the rear of the butting ring, each said lubricant storage pocket being connected by a respective connecting channel to an associated lubricant pocket. However, it is also possible to provide a common, annular lubricant storage pocket in the butting ring which is connected by a respective connecting channel to each lubricant pocket or pockets.

The butting ring is preferably made from plastics material as this enables it to be injection moulded in one piece in any random shape. The butting ring is constructed with particular advantage as a resilient push-button, for example, as shown in U.S. patent application Ser. No. 07/737767, or as an intermediate disc, for example, as shown in U.S. Pat. No. 4,613,778. The butting ring is generally fixed to the shaft and rotates therewith. The abutment face of the butting ring may be located on the bearing or on a sliding disc axially upstream thereof.

BRIEF DESCRIPTION OF THE DRAWINGS

Embodiments of the present invention are hereinafter described, by way of example, with reference to the accompanying drawings, in which:

FIGS. 8 to 10 shows an axial plan view, a section taken on line IX—IX and a section taken on line X—X of a third embodiment of a butting ring of the invention.

DESCRIPTION OF PREFERRED EMBODIMENTS

Figure 1:
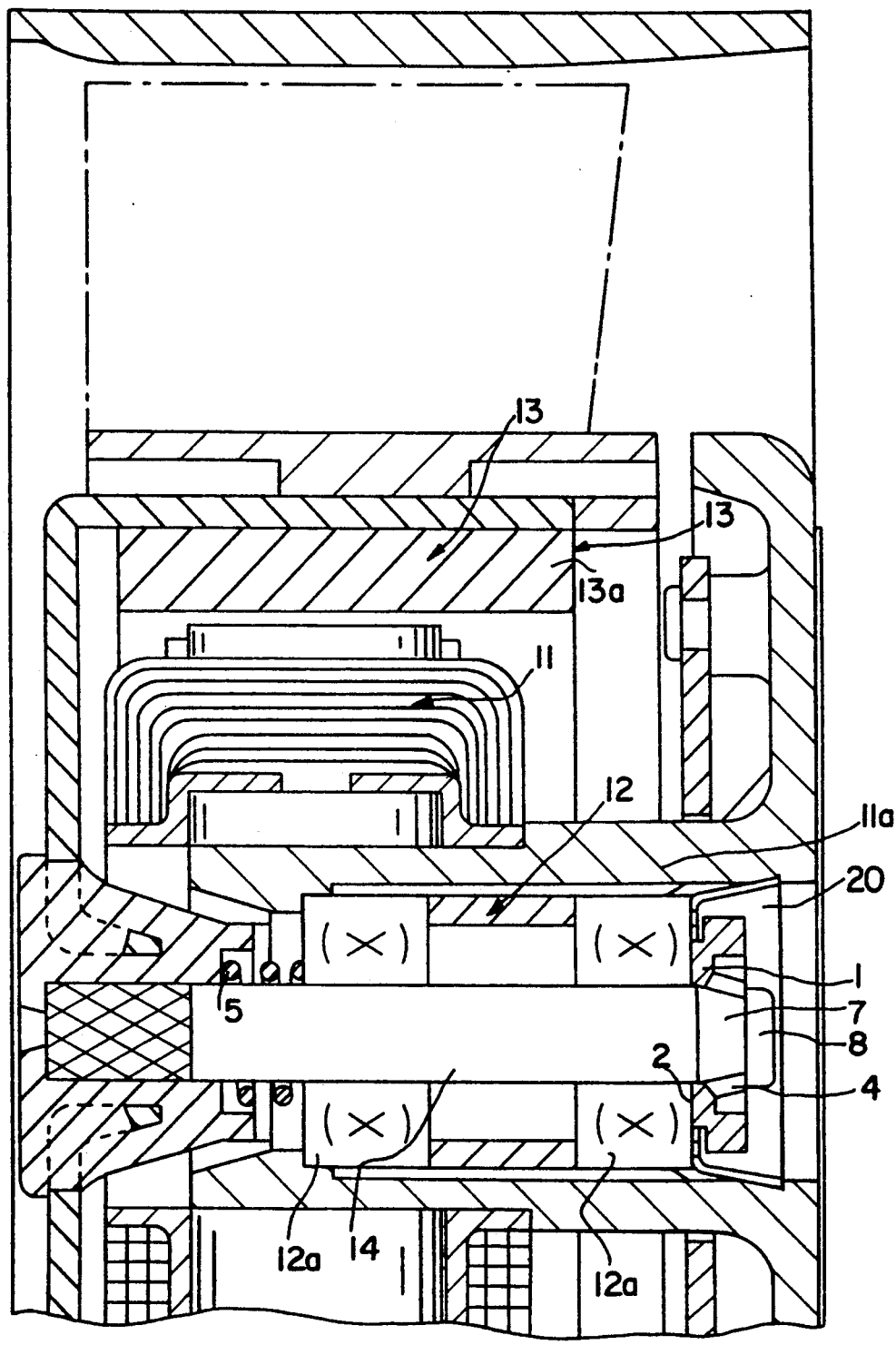
FIG. 1 shows a cross-section of an electric motor incorporating a first embodiment of a butting ring of the invention.

The electric motor shown in FIG. 1 is an external rotor motor, having a bearing 12 which comprises two spaced ball bearings 12a. The electric motor stator 11 has a bearing tube 11a in which are located both the ball bearings of the bearing 12 and which are fixed therein by way of a retaining clip 20. The electric motor rotor 13 carries a substantially cylindrical permanent magnet 13a and is fixed by means of a rotor pin on a rotor shaft 14, which is journalled in the bearing 12.

In its axial direction, the rotor shaft 14 is supported, at or proximate one end, by an elastic intermediate member, whereas, at or proximate its other end, the shaft 14 is supported by a butting ring 1. In FIG. 1, the elastic intermediate member is illustrated to the left of the drawing and comprises a compression spring 5. Similarly, in FIG. 1, the butting ring 1 is illustrated to the right of the drawing. In the embodiment of FIG. 1, the butting ring 1 is in the form of a locking ring which is fixed by means of elastic supporting arms 4 in a recess 7 of a butt end 8 of the shaft 14. An abutment surface 2 of the butting ring 1 abuts against the end face of one of the ball bearings 12a of the bearing 12.

Figure 2:
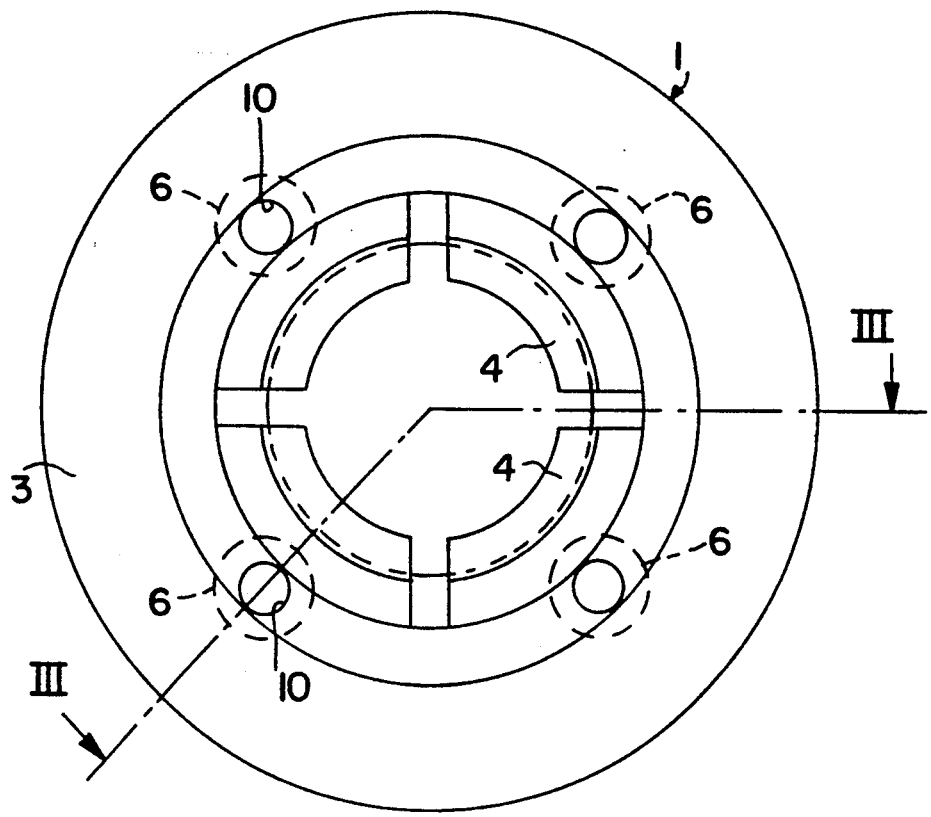
FIG. 2 shows a plan view taken in the axial direction of the butting ring incorporated in the motor of FIG. 1.
Figure 3:
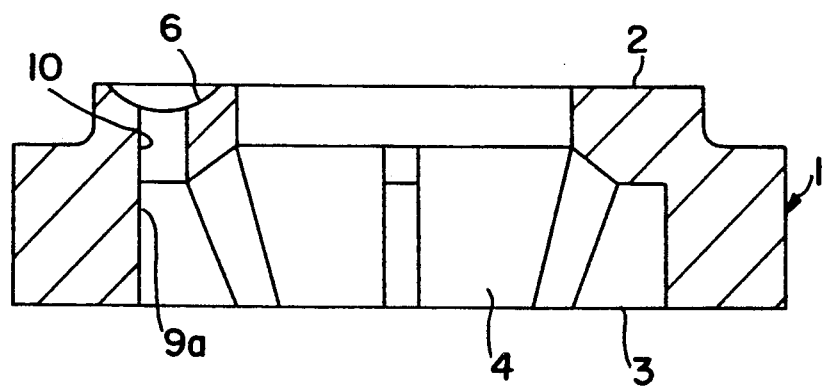
FIG. 3 shows a section of the butting ring taken along line III—III of FIG. 2.

The details of the butting ring 1, are not apparent from FIG. 1, but its features can be seen clearly in FIGS. 2 and 3. In this respect, the butting ring 1 is a substantially annular member having a stepped peripheral surface and spaced, substantially planar surfaces 2 and 3. The surface 2 is the front, abutment surface, and the opposite surface 3 is the rear, outer surface. Four lubricant pockets 6 are provided in and are substantially equally angularly spaced around, the abutment surface 2. In this embodiment, each lubricant pocket 6 is preferably shaped as a flat spherical segment, but alternative shapes are also possible. It will be appreciated that the butting ring 1, and hence its abutment surface 2, will rotate with the rotor shaft 14. Because of this, it is important that the rotating lubricant pocket 6 tapers against its rotation direction towards the abutment surface 2.

Each lubricant pocket 6 is connected by a respective axially extending connecting channel 10 to a lubricant storage pocket 9a. In this embodiment, the lubricant storage pocket 9a has a large volume construction, being formed by an annular recess opening in the rear surface 3 and extending all around the ring 1. It will be appreciated that each lubricant pocket 6 is supplied with lubricant by means of its own connecting channel 10. Advantageously, each channel 10 is relatively narrow to cause a capillary action for filling each pocket 6. Furthermore, the lubricant is preferably a lubricating oil. The lubricant storage pocket 9a is positioned on the rear surface 3 of the butting ring 1 and, as indicated in FIG. 1, can consequently be filled from the rear with lubricant after the electric motor has been assembled.

In the embodiment of FIG. 1, the butting ring 1 is only used for fixing the shaft 14 axially with respect to the rotor 13, for example, as is described in German Utility Model No. 9011187 or U.S. patent application Ser. No. 07/737767. Lubricant pockets are not necessary here, because the butting ring 1 co-rotates with the inner ring of the ball bearing. FIG. 1 shows that an inventive element can be used for journal bearings and ball bearings, which also simplifies lock keeping.

Figure 4:
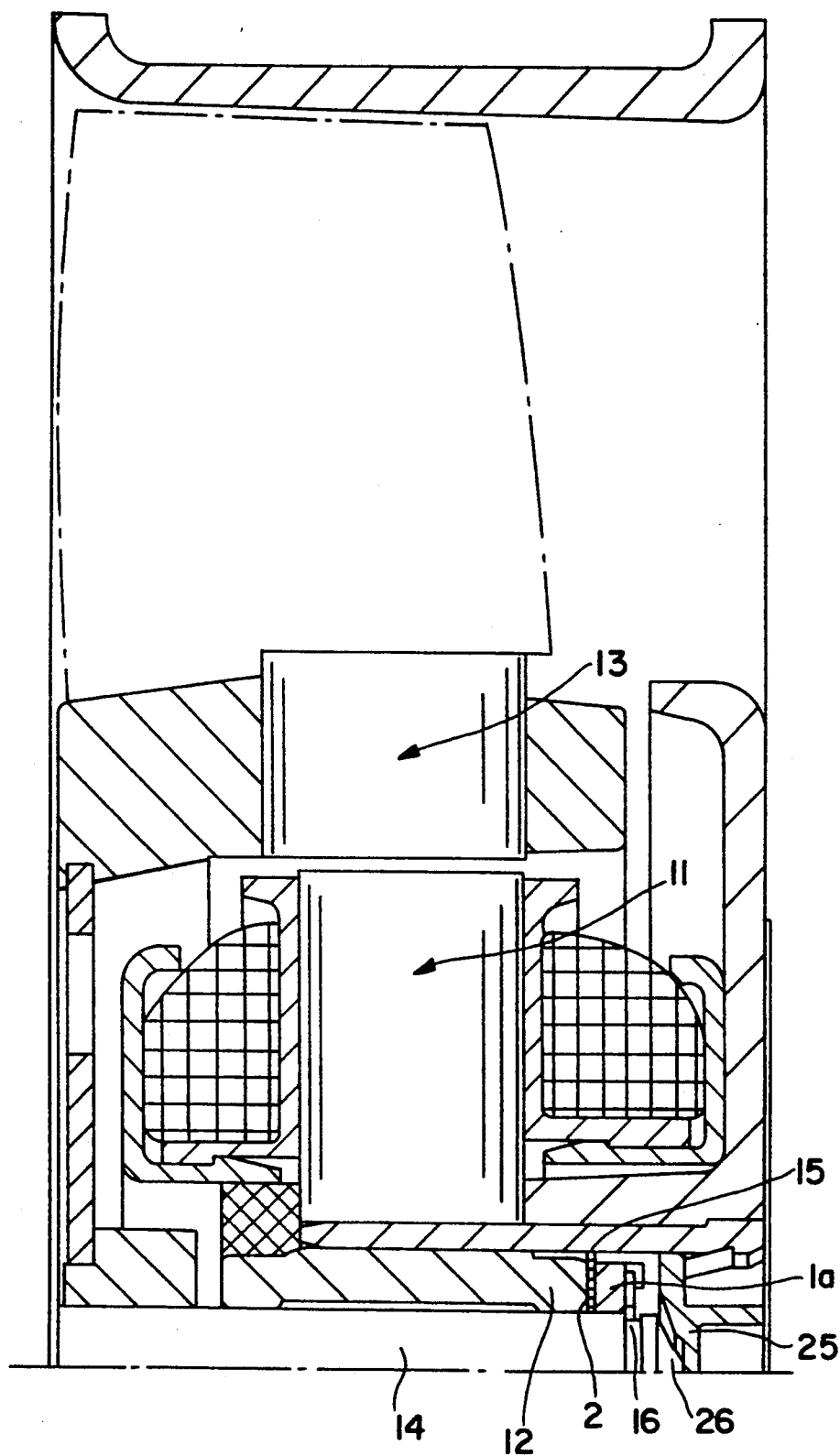
FIG. 4 shows a cross-section through an alternative electric motor incorporating a second embodiment of a butting ring of the invention.

FIG. 4 shows a second embodiment of an electric motor in which a butting ring of the invention can be utilized. This electric motor is also an eternal rotor motor with a rotor 13 and a stator 11. The rotor 13 is fixed to the rotor shaft 14, which is journalled in the bearing 12. At or near one end the rotor shaft 14 has a recess, into which a circlip 16 is inserted. A sliding disc 15 and the butting ring 1a are located between the circlip 16 and one face of the bearing 12.

At its right-hand end as shown in FIG. 4, the rotor shaft 14 has a dome 26 which is arranged to abut against a snap element 25. The snap element 25 serves as a cover plate for the bearing and simultaneously axially fixes the rotor shaft 14 to the casing, (as shown in U.S. Pat. No. 4,995,791 [=482]).

Figure 5:
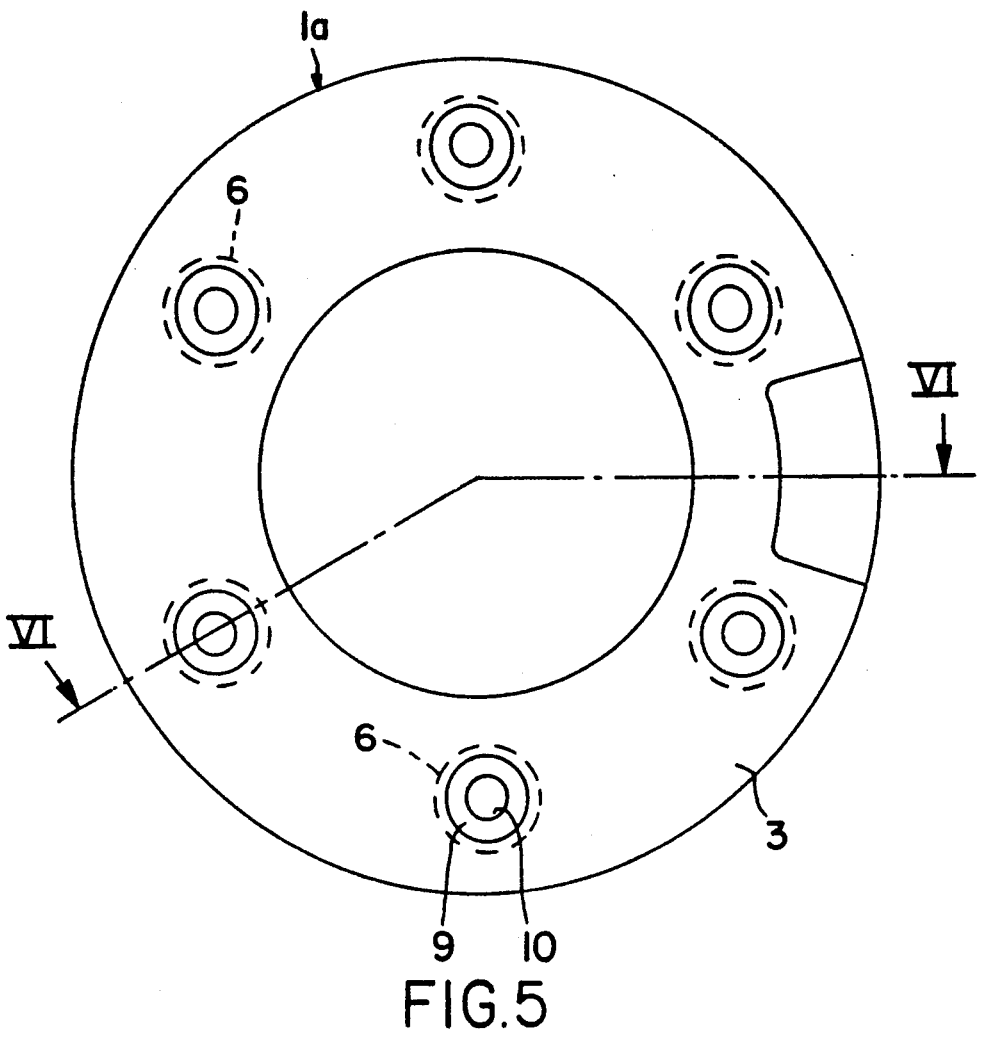
FIG. 5 shows a plan view taken in the axial direction of the butting ring incorporated in the motor of FIG. 5.
Figure 6:
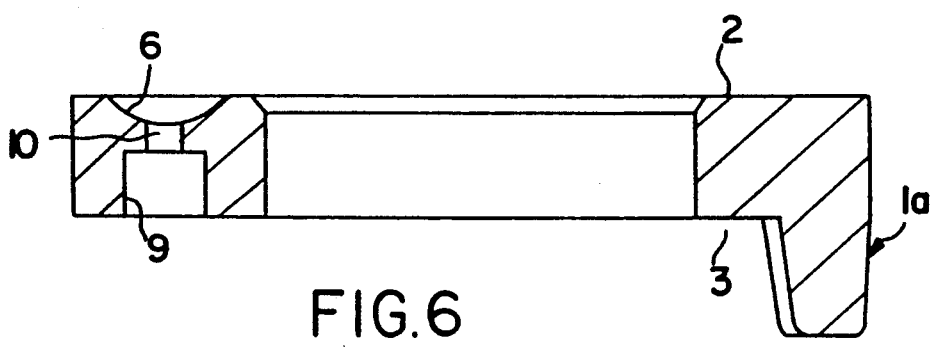
FIG. 6 shows a section of the butting ring taken along the line VI—VI of FIG. 5.

As can be seen from FIGS. 5 and 6, a plurality of lubricant pockets 6 are provided in the abutment surface 2 of the butting ring 1a. These pockets 6 are substantially equally spaced circumferentially of the ring 1. On its rear 3, an equal number of lubricant storage pockets 9 in the form of bores are provided. The lubricant storage pockets 9 are each connected to a respective lubricant pocket 6 by means of one associated connecting channel 10. In this embodiment also, the lubricant, for example, oil, can be filled into the lubricant storage pockets 9 from the back of the motor, so that this can also be done after motor assembly.

In the two embodiments described above, lubrication takes place by means of lubricant pockets 6 and lubricant storage pockets 9 or 9a, which are interconnected by connecting channels 10. However, it is also possible to provide only the lubricant pockets 6 and to omit the separate lubricant storage pockets, as 9 or 9a. Of course, in this latter case, the amount of lubricant which can be introduced into the motor is smaller.

In the embodiments illustrated, the butting ring 1 or 1a has been injection moulded in one piece from plastics material. However, it is also possible to make the butting ring 1, 1a from other materials, for example, from metal, such as a sintered part.

Figure 7:
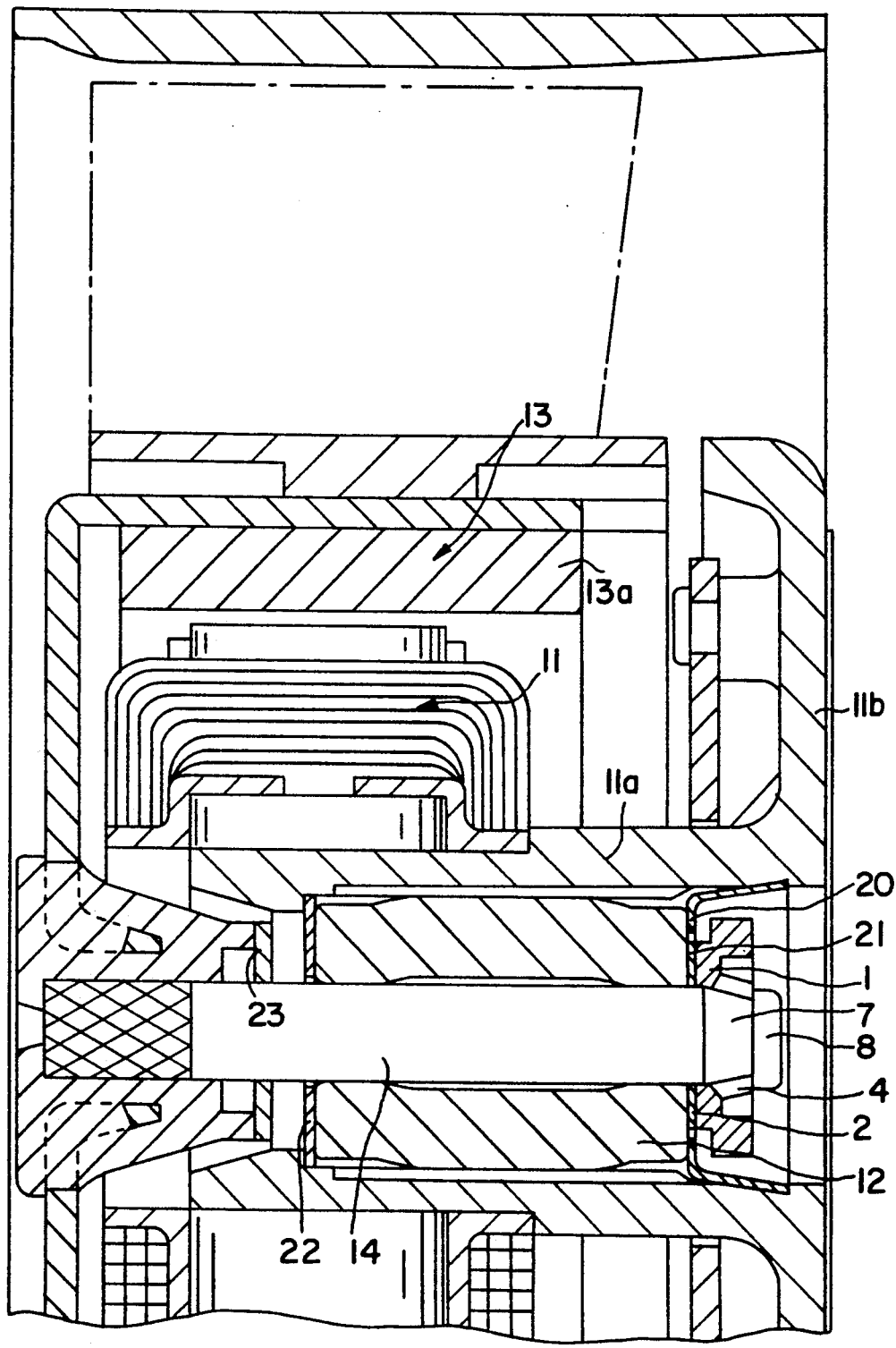
FIG. 7 shows a cross-section of a still further alternative electric motor incorporating the butting ring shown in FIGS. 2 and 3.

The electric motor shown in FIG. 7 is also an external rotor motor with a bearing 12. The electric motor stator 11 has a plastic bearing tube 11a formed in one piece with a flange 11b. The bearing tube 11a houses the bearing 12 which is fixed by way of a plate-shaped retaining clip 20. The rotor 13 carries a cylindrical permanent magnet 13a and is fixed by means of a rotor hub to the rotor shaft 14 which is mounted in the bearing 12.

As shown to the right of the drawing, the motor is provided with a butting ring 1, in the form of a locking ring, which is fixed by means of elastic supporting arms 4 in a recess 7 of the end 8 of the shaft 14. An abutment surface 2 of the butting ring 1 abuts against a slidable disc 21 which engages on the face of the bearing 12.

At the other end of the bearing 12, shown to the left in FIG. 7, a steel disc 22 is provided, and on the rotor side of the left hand end of the shaft 14 there is provided a plastics material disc 23. If, as a result of extreme operational vibrations, the rotor 13 is driven far towards the right, as seen in FIG. 7, the rotor side plastics disc 23 would come into abutment with the disc steel 22, which has emergency run characteristics.

However, the magnetic field almost always prevents such axial movement of the shaft 14 because, in the same way as a spring, the greater the travel of the shaft 14, the more the magnetic field draws the rotor 13 to the left. That is the magnetic field urges the rotor back to the aforementioned balanced position with respect to axial forces, where the forces are compensated.

The butting ring 1 incorporated in the motor of FIG. 7 is substantially as shown in FIGS. 2 and 3 and described above.

FIGS. 8 to 10 show a further embodiment of a butting ring 1a of the invention. The butting ring 1a is similar to those described above except that a different form or shape of lubricant pocket 6 is shown. In this embodiment, each pocket 6 in the abutment surface 2 has surfaces 26, 27 which, starting from the maximum depth in the central area of the pocket 6, taper towards the abutment surface 2, so that the shape of each pocket 6 is similar to that of a prism. The surfaces 26, 27 may be planer, or may be, for example, in the form of tangentially tapering, curved surfaces 38 or 39.

This shape of the lubricant pockets 6 is also usable in the embodiments of the butting ring described with reference to FIGS. 2, 3, 5 and 6. All the illustrated embodiments of the butting ring 1, 1a are suitable for clockwise and counter clockwise rotation.

FIG. 10 shows a planar sloping surface 38 in broken line form on one side for a one-sided pocket and which is intended for rotation in only the direction of the arrow 37. It has a small angle of inclination of 5° to 30° relative to the abutment surface 2 of the butting ring.

The dot-dashed line 39 indicates a variant which has a character such that it abuts the surface 2 substantially tangentially.

In all of the drawings, the co-rotating butting rings are fixed to the shaft and for example, are in accordance with U.S. Pat. No. 4,613,778.

However, in the case of FIG. 7, through the additional construction of the butting ring 1 as a snap ring in accordance with U.S. patent application Ser. No. 07/737767 or German Utility Model No. 9011187, the butting ring 1 is pressed slightly against the bearing 12 or the sliding disc 21.

FIGS. 1 and 7 show direct current motors as the drive for the axial-flow fan, whereas FIG. 4 shows an alternating current motor. All the motors shown are external rotor motors. However, the invention can also be used with internal rotor motors.

It will be appreciated that modifications and variations to the invention as described above may be made within the scope of the appended claims.

I claim:

1. In a rotor shaft arrangement comprising an elongate rotatable rotor shaft, an axially extending bearing through which said rotor shaft extends for rotation within the bearing, said bearing having a planar end surface and a rotatably annular butting ring having first and second spaced planar surfaces, said annular butting ring being positioned such that its said second and first planar surfaces, abut said rotor shaft and said bearing planar end surface, respectively, an improvement comprising at least one lubricant pocket provided in said first planar surface of said butting ring, said lubricant pocket having an open area at said first surface which open area is covered by said planar end surface of said bearing to provide lubricant between the abutting first planar surface of the annular butting ring and the end planar surface of the bearing.

2. The butting ring according to claim 1, wherein the butting ring is arranged to rotate and said lubricant pocket is shaped such that it tapers away from the first planar surface.

3. The butting ring according to claim 1, wherein said lubricant pocket is shaped substantially as a flat spherical segment.

4. The butting ring according to claim 1, wherein said lubricant pocket is shaped as a conical or cylindrical portion.

5. The butting ring according to claim 1, wherein said lubricant pocket has surfaces which, starting from the maximum depth of the lubricant pocket, taper towards said first surface.

6. The butting ring according to claim 1, wherein a plurality of lubricant pockets are provided and are spaced over said first surface, said lubricant pockets being spaced one from the other by equal angular distances.

7. The butting ring according to claim 6, wherein at least one lubricant storage pocket is located in the second surface of the butting ring, and further comprising one or more connecting channels axially traversing said butting ring, each said connecting channel connecting a respective lubricant pocket to the lubricant storage pocket.

8. The butting ring according to claim 7, wherein a number of lubricant storage pockets, equal in number to the number of lubricant pockets, are provided, and wherein each lubricant storage pocket is connected by a connecting channel to an associated lubricant pocket.

9. The butting ring according to claim 7, further comprising an annular, hollow lubricant storage pocket provided in the second surface of said butting ring, and connected to each lubricant pocket by a respective connecting channel.

10. The butting ring according to claim 1, wherein said ring is made from plastic.

11. The butting ring according to claim 1, wherein said butting ring is constructed as a resilient push-button fixed to the motor shaft, preferably such that the butting ring engages with slight axial pressure on the bearing or on a sliding disc.

12. The butting ring according to claim 1, wherein said butting ring is constructed as an intermediate disc, and, in particular, is connected in non-rotary manner to the shaft by means of an additional member, with which it is interlocked.

* * * * *